United States Patent
Ikemori

[11] 4,135,786
[45] Jan. 23, 1979

[54] ZOOM LENS SYSTEM

[75] Inventor: Keiji Ikemori, Yokohama, Japan

[73] Assignee: Canon Kabushiki Kaisha, Tokyo, Japan

[21] Appl. No.: 770,777

[22] Filed: Feb. 22, 1977

[30] Foreign Application Priority Data

Feb. 26, 1976 [JP] Japan .................. 51-020473

[51] Int. Cl.² ............................... G02B 15/18
[52] U.S. Cl. .................................... 350/184
[58] Field of Search ................... 350/184, 186

[56] References Cited
U.S. PATENT DOCUMENTS

3,840,290 10/1974 Betensky ........................... 350/186

Primary Examiner—Conrad J. Clark
Attorney, Agent, or Firm—Toren, McGeady and Stanger

[57] ABSTRACT

A zoom lens system comprising, from front to rear, a focusing lens group having a positive refractive power, a front movable lens group, a middle movable lens group, a rear movable lens group and a relay lens group, the front and middle lens groups having negative refractive powers. When zooming, these three movable lens groups are moved simultaneously and independently of each other in such a manner that the front and middle groups at the telephoto side occupy nearer positions to the image plane than those which they occupy at the wide-angle side. The axial separation between the front and middle groups at the telephoto side is smaller than that at the wide-angle side. Further, the front and rear surfaces of the middle movable lens group are convex toward the image side.

2 Claims, 24 Drawing Figures

FIG.1

WIDE-ANGLE SIDE

FIG.2

TELEPHOTO SIDE

SPHERICAL ABERRATION AND SINE CONDITION

FIG.6D  FIG.6E  FIG.6F

ASTIGMATISM

FIG.6G  FIG.6H  FIG.6I

DISTORTION (%)

SPHERICAL ABERRATION AND SINE CONDITION

FIG.8D  FIG.8E  FIG.8F

ASTIGMATISM

FIG.8G  FIG.8H  FIG.8I

DISTORTION (%)

ZOOM LENS SYSTEM

BACKGROUND OF THE INVENTION

This invention relates to mechanically-compensated zoom lenses particularly suited to extend the zooming range toward shorter focal lengths.

In providing a zoom lens of the type having a convergent front lens group for focusing stationary during zooming and two lens groups movable for zooming to effect a variation in focal length of the system with simultaneous effect of the image shift compensation, it has been proven that any improvements of the conventional design features are almost impossible in order to achieve further increases in the image angle at the wide-angle setting as well as in relative aperture and zoom ratio without causing unduly large increases in the overall dimensions and further without causing deterioration of image quality over the entire zooming range.

The conventional design features for increase in image angle at the wide-angle setting are:

(1) To increase the diverging power of the divergent lens group having a function of varying the focal length of the system (the so-called variator) which is positioned in rear of the focusing lens group (the convergent lens group rendered movable wholly or in part);

(2) To increase the axial distance between the positions which the diaphragm and the variator occupy at the wide-angle setting; and (3) To decrease the overall focal length of the image-forming lens group (relay lens).

These three main methods are, however, associated with the following respective short-comings. The first-mentioned method tends to produce a large barrel-type (under-corrected) distortion at the wide-angle setting. This under-correction of distortion is usually compensated by bending the focusing lens to convexity in the rearward direction. By this operation, however, extreme under-correction of astigmatism will result and, when zoomed to the telephoto settings, extreme over-correction of spherical aberration is produced which is attributable to the variator since it has a strong diverging power. When the necessary compensation for such spherical aberration is concentrated either at the focusing lens or at the compensator, it is difficult to achieve a good stability of correction of aberrations throughout the focusing range or the zooming range respectively.

The second method though capable of achieving somewhat good level of aberrational correction at the wide-angle settings calls for an increase in focal length of the focusing lens since the total length of the zooming section is increased. As a result, the focusing lens is required to perform an increased total axial movement which in turn calls for an increase in diameter of the front lens member, thereby the complete system is made quite heavy and bulky.

The third method, because of the decreased focal length of the relay lens, renders it difficult to secure a desired back focal length. In addition thereto, the angle of inclination of the extreme off-axis light bundle incident upon the front surface of the relay lens is increased with the resultant diameter of the front lens member of the system being increased. This leads to deterioration of distortion and astigmatism at the wide-angle positions.

As far as the conventional lens design features for the zoom type described above are concerned, therefore, it is very difficult to achieve simultaneous establishment of a great increase in image angle at the wide angle settings with great increases in relative aperture and zoom ratio, while nevertheless preserving good stability of correction of aberrations throughout the zooming range and the limitation of the overall dimensions to a minimum.

It is known to provide an alternate type of zoom lens including three movable lens groups for zooming, as, for example, disclosed in Japanese patent application laid open for inspection Sho 50-126441, which is assigned to the assignee of the present invention. The practical embodiments of the zoom lens disclosed therein are directed to the employment of a focusing lens group which has a negative refractive power. The three lens groups movable for zooming behind the focusing lens group have positive, negative and positive refractive powers respectively. During zooming, the front and middle movable groups are moved in the opposite directions to each other, while the rear movable group is moved independently of the preceding two movable groups. In Japanese patent application laid open for inspection Sho 50-149360, there is described a zoom lens comprising a positive movable lens group, a negative movable lens group, a negative movable lens group and a positive relay lens group. These three movable groups are simultaneously moved during zooming. The axial movement of the front movable group is regulated by a U-shape cam. The focusing of this zoom lens seems to be performed by moving the entire system.

SUMMARY OF THE INVENTION

The object of the present invention is to provide a zoom lens system having to a larger image angle and which is compatible with simultaneous increases in relative aperture and zoom ratio, while nevertheless preserving good correction of aberrations throughout the extended zooming range without introducing unduly large complexity into the lens system and also maintaining the overall dimensions of the entire system to the heretofore attained minimum level.

In one embodiment of the invention, the zoom lens system comprises an image-forming lens group preceded by a plurality of lens groups movable for zooming behind a convergent front lens group which is stationary during zooming, the front lens group having a focusing function and the plurality of movable lens groups including a divergent first lens group counting from the front, a divergent second lens group and a convergent third lens group. These three movable lens groups are simultaneously moved during zooming in such a manner that as the divergent first lens group is moved toward the image plane with reference to the lens arrangement at the wide-angle setting, the divergent second lens group is moved independently of the divergent first lens group. Further, the axial separation between the first and second lens groups becomes shortest at the telephoto setting during the zooming.

Letting $f_{III}$ denote the focal length of the divergent second lens group, and $f_{II,III}$ the overall focal length of the divergent first lens group and the divergent second lens group occurring at the telephoto setting, it is preferred that the absolute value of $f_{III}$ is larger than two times that of $f_{II,III}$.

On the other hand, the number of lens elements constituting the divergent second lens group may be reduced extremely. To achieve high level of image quality, there is no need to construct the divergent second lens group in the complicated form more than a rearwardly convex meniscus-shaped singlet or likewise shaped achromatic doublet. In this case, it is preferred that the absolute value of $F_{III}$ is larger than eight times that of $f_{II,III}$.

DESCRIPTION OF THE PREFERRED EMBODIMENT

Figure 1:
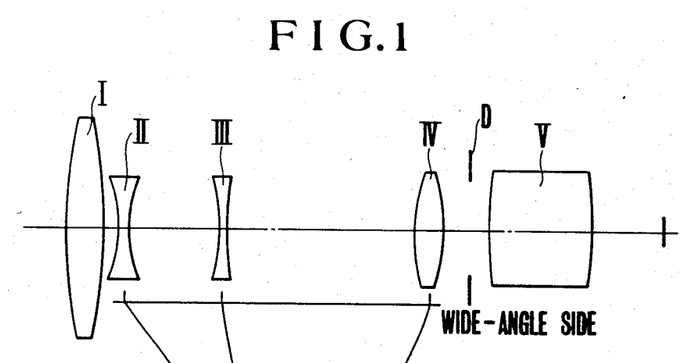
FIGS. 1 and 2 show a zoom lens predesign of the present invention in the wide angle and telephoto positions respectively.
Figure 2:
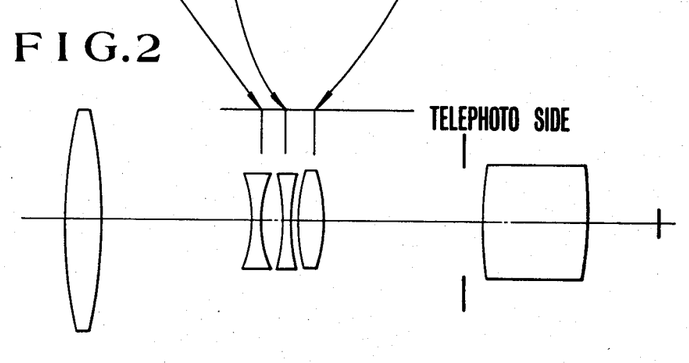

FIGS. 1 and 2 show a basic construction of one embodiment of the present invention with FIG. 1 showing a lens arrangement occurring at the wide angle setting, and with FIG. 2 showing that occurring at the telephoto setting. The zoom lens comprises a convergent front lens group I movable for focusing, a divergent first lens group II (hereinafter referred to as the first lens group), a divergent second lens group III (hereinafter referred to as the second lens group), a convergent lens group IV, and an image forming lens group V (including a so-called relay lens). The lens groups II, III and IV are simultaneously moved independently of each other during zooming. When the zooming is performed from the wide-angle setting to the telephoto setting, the first lens group II is moved toward the image plane, and the second lens group II is also moved toward the image plane so that the positions which they occupy at the telephoto setting are nearer to the image plane than those which they occupy at the wide angle setting. At this time, the construction is such that the axial separation between the first lens group II and the second lens group III becomes minimum at the telephoto side during zooming.

Also, the convergent lens group IV is displaced along a non-linear cam when zooming from the wide-angle side to the telephoto side.

D is a diaphragm in a space between the convergent lens group IV and the image-forming lens group V. In connection with the aberrations to be described later, it is required that the diaphragm D must be positioned on the image side of at least the second lens group III.

Further, in the specific examples of the zoom lens to be described later, there are further provided a negative lens (R21, R22) rendering the light bundle emanating from the zoom part to become afocal, and a prism (R23, R24) within the image-forming lens group V.

In the following, the effect of the invention will be explained. In the wide angle side arrangement shown in FIG. 1, there is provided a negative movable lens group between lens groups corresponding respectively to the negative variator and positive compensator of a conventional zoom system. Upon selection of a suitable focal length for this negative movable lens group, it becomes possible to increase the image angle to a desired level at the wide angle side without decreasing the focal length of the variator, or without increasing the distance between the variator and the diaphragm as in the conventional methods.

This reason will next be explained. In concern with aberrational correction, it can be said that, in terms of 3rd order aberrations, spherical aberration is almost proportional to $h^4$, coma to $h^3\bar{h}$, astigmatism to $h^2\bar{h}^2$ and distortion to $h\bar{h}^3$, wherein h is the height of a point from the optical axis at which a paraxial ray of light entering in parallel with the optical axis is incident upon the principal plane of the individual block (individual lens group), and $\bar{h}$ is the height of a point from the optical axis at which an off-axis ray of light passing through the center of the diaphragm aperture is incident upon the principal plane of the individual block (see Yoshiya Matsui "Lens Design" p. 87 with formula 4.6a). It has already mentioned that when the image angle at the wide angle side is increased from that of the known zoom lens, somewhat barrel-type distortion is produced which can be compensated by the bending of the positive lens group for focusing to the rearward convexity. In practice, however, the bending of the positive lens group for focusing means that while the focal length of this group is maintained constant, the front surfaces of some positive lens elements air-spaced from each other in this group are made weaker in converging action, or stronger in diverging action by certain magnitudes for which the rear surfaces thereof are made stronger in converging action, or weaker in diverging action.

And when distortion is corrected, under-corrected astigmatism is produced. The latter must be compensated for. In the zoom lens type to which the present invention relates, when zoomed at the wide angle side, the entire system is of inverted telephoto type so that the first lens group II has its concern with $|\bar{h}_2| > |h_2|$. Therefore, the distortion coefficient $|h_2\bar{h}_2^3|$ is varied to a larger degree than that to which the astigmatism coefficient $|h_2^2\bar{h}_2^2|$ is varied. For this reason, over-correction of astigmatism leads to an increase in deterioration of barrel type distortion.

On the other hand, the second lens group III because its relative position in the lens system provides a far smaller difference between $\bar{h}_3$ and $h_3$ than that of the first lens group II. If over-correction of astigmatism is effected by use of this second lens group III, therefore, deterioration of distortion becomes reduced. Further, it can be said that 5th and higher order distortions is the less affected. The values of the heights of incidence of paraxial on-axis and off-axis rays, h, and $\bar{h}$, for Example 1 lens to be described later based on a shortest focal length of unity are shown in Table 1 below.

Table 1

| Lens group | f = 5.7 | | f = 29 | | f = 70 | |
|---|---|---|---|---|---|---|
| | h | $\bar{h}$ | h | $\bar{h}$ | h | $\bar{h}$ |
| I | 1. | −4.92 | 5. | −5.54 | 12. | −6. |
| II | 0.89 | −3.15 | 2.45 | −1.65 | 4.4 | −1.67 |
| III | 2.02 | −2.09 | 3.38 | −1.5 | 5.32 | −1.67 |
| IV | 4.76 | −0.66 | 6.2 | −1.36 | 7.11 | −1.8 |

It is understood from Table 1 that at the wide angle side (f = 5.7) the absolute values of $\bar{h}$ for the first lens group II is far larger than that of h, while the absolute value of $\bar{h}$ for the second lens group III is almost equal to that of h.

As can be seen from a 3rd order aberration coefficient table of Example 1, i.e from Table 2, the first lens group II (R9 to R13) and the second lens group (R14, R15) at the wide angle side contribute astigmatism (AS) and distortion (DS) at AS(II) = −0.4648; DS(II) = 2.23914; AS(III) = −0.04446 and DS(III) = 0.12136. It follows that as far as the first lens group II and the second lens group III are concerned, astigmatism is affected to almost equal extents to each other with respect to over-correction thereof, but the tendency of distortion to deteriorate toward under-correction is far more responsible to the first lens group II than to the second lens group III.

Table 2

|  |  | L | T | SA | CM | AS | PT | DS |
|---|---|---|---|---|---|---|---|---|
| $R_1$ | W | 0.000032 | 0.003969 | 0.00018 | −0.00427 | 0.13270 | 0.05813 | −1.94638 |
|  | M | 0.000794 | 0.003207 | 0.10898 | −0.20922 | 0.43349 | 0.05813 | −0.90034 |
| $R_8$ | T | 0.004500 | 0.001651 | 3.49806 | −2.39470 | 1.67118 | 0.05813 | −1.19817 |
| $R_9$ − | W | 0.000074 | 0.001606 | −0.02721 | 0.00167 | −0.04648 | −0.20627 | 2.23914 |
|  | M | −0.002079 | 0.004830 | −0.69448 | 0.24063 | −0.35275 | −0.20627 | 0.77632 |
| $R_{13}$ | T | −0.016028 | 0.011184 | 2.49952 | −5.33517 | −1.51582 | −0.20627 | 1.06956 |
| $R_{14}$ − | W | −0.002853 | 0.002556 | −0.00385 | 0.01363 | −0.04446 | −0.02446 | 0.12136 |
|  | M | −0.008238 | 0.003445 | 0.01404 | 0.00810 | −0.03176 | −0.02446 | 0.04851 |
| $R_{15}$ | T | −0.019473 | 0.006441 | 0.21085 | −0.36238 | −0.12324 | −0.02446 | 0.07570 |
| $R_{16}$ − | W | 0.026588 | −0.006313 | 1.49840 | −0.71622 | 0.39733 | 0.12310 | −0.17559 |
|  | M | 0.041242 | −0.012672 | 2.41732 | −0.82438 | 0.45367 | 0.12310 | −0.26197 |
| $R_{20}$ | T | 0.051755 | −0.017346 | 3.87453 | −1.08323 | 0.48969 | 0.12310 | −0.28669 |
|  | order aberrations |  |  |  |  |  |  |  |
| $R_{21}$ | W | −0.051247 | 0.006556 | −5.24648 | 1.52635 | −0.45364 | −0.09246 | 0.12189 |
|  | M | −0.051247 | 0.006556 | −5.24648 | 1.52635 | −0.45364 | −0.09246 | 0.12189 |
| $R_{22}$ | T | −0.051247 | 0.006556 | −5.24647 | 1.52634 | −0.45364 | −0.09246 | 0.12189 |
| $R_{23}$ −W | 0.-018945 | −0.005326 | 3.76712 | −0.78004 | 0.03030 | 0.12452 | 0.00577 |  |
|  | M | 0.018945 | −0.005326 | 3.76712 | −0.78004 | 0.03030 | 0.12452 | 0.00577 |
| $R_{33}$ | T | 0.018945 | −0.005326 | 3.76712 | −0.78004 | 0.03030 | 0.12452 | 0.00577 |
| Total | W | −0.008460 | 0.003046 | −0.01184 | 0.04113 | 0.01576 | −0.01743 | 0.36619 |
|  | M | −0.00583 | 0.000039 | 0.36650 | −0.03856 | 0.07924 | −0.01743 | −0.20982 |
|  | T | −0.011547 | 0.003160 | 0.19570 | −0.02125 | 0.09847 | −0.01743 | −0.21194 |

Therefore, the second lens group III can be used to compensate under-correction of astigmatism without causing distortion to become of barrel type, as the distortion is corrected for the increased image angle at the wide angle side. On this account, it is effective for the second lens group III to be positioned at a location such that $|h^2\bar{h}^2|$ becomes as large as possible, and $|h\,\bar{h}^3|$ becomes as small as possible.

As a result of the foregoing, it has been proven that both of the problems of compensating barrel type distortion and under-corrected astigmatism caused by the increase in image angle at the wide angle side and of limiting the overall dimensions of the zoom lens to a minimum can be overcome by the method of the invention.

In such a way, it is on the wide angle side that the second lens group III plays a very important role in astigmatic correction, but it is desirable that, on the telephoto side, as small spherical aberration as possible is produced.

This is mainly because the aberration variation with focusing at the telephoto settings and the aberration variation with zooming are minimized.

In general, spherical aberration is proportional to $h^4$. Therefore, in the case of the invention, it is possible to decrease variation of spherical aberration by decreasing the height, $h_3$, of a point of a paraxial on-axis ray incident upon the principal plane of the second lens group to as small a level as possible. As the rays of light emanating from the first lens group II are divergent, this level will be at minimum when the axial separation between the first and second lens groups II and III becomes shortest, reaching a limit with $h_3 = h_2$.

It is preferable that the focal length $f_{III}$ of the second lens group III is made larger to some extent than the overall focal length $f_{II.III}$ of the first and second lens groups II and III occurring at the telephoto setting. Upon consideration of the possibility of increasing the number of lens elements necessary to constitute the second lens group III for the purpose of facilitating aberrational correction, the absolute value of $f_{III}$ is preferably larger than 2 times that of $f_{II.III}$. This is because when this lower limit is exceeded, the diverging action of the second lens group becomes so strong that spherical aberration on the telephoto side is over-corrected to a large extent, whereby, as has been mentioned above, it is made more difficult to achieve maintenance of high image quality on the telephoto side particularly when the zoom lens in question is provided with a large relative aperture and a large zoom ratio.

By juxtapositioning the first lens group II to the second lens group III at the telephoto setting, or, in addition thereto, by specifying the focal length of the second lens group III, it is made possible to maintain the image quality at a good level even on the telephoto side. Where the second lens group III is constructed in the form of a singlet or achromatic doublet, it is required to impart into this singlet or doublet a meniscus shape of rearward convexity and further to adjust $f_{III}$ to an absolute value larger than 8 times that of $f_{II.III}$, or otherwise the over-correction of spherical aberration caused by the singlet or doublet would be intensified to so large extent that such a large relative aperture and high image quality can not be obtained. It is to be noted here that, in the case of Example 1, $f_{III} = 13.43 f_{II.III}$. As can be seen from Table 2, the first lens group II at the telephoto setting gives a spherical aberration of SA(2) = −5.33517, while the second lens group III gives a spherical aberration of SA(3) = −0.36238 which is almost negligible compared with the sum of SA(2) and SA(3), i.e. −5.69755.

Figure 3:
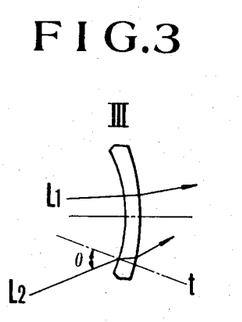
FIGS. 3 and 4 diagrammatically show a change in optical effect of the divergent second lens group when the zooming is performed between the wide angle and telephoto positions respectively.
Figure 4:
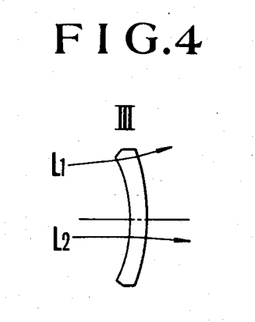
Figure 5:
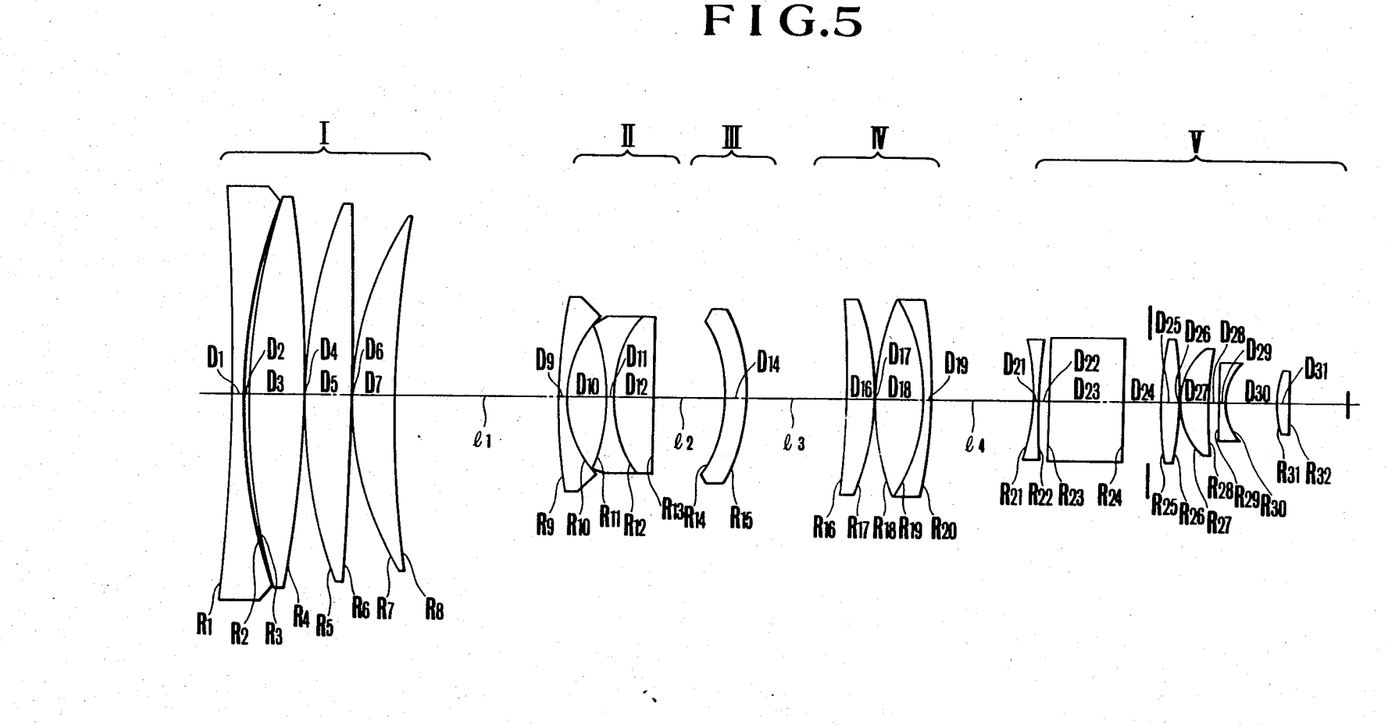
FIG. 5 is a block diagram of a first specific example of a zoom lens according to the present invention.
Figure 6A:
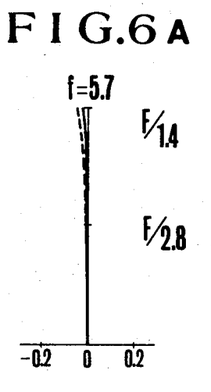
FIGS. 6A, 6B and 6C show spherical aberrations and sine conditions of the zoom lens of FIG. 5 when zoomed at the shortest, middle and longest focal length positions respectively.
Figure 6B:
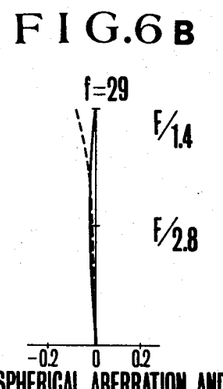
Figure 6C:
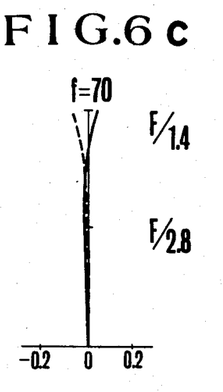
Figure 6D:
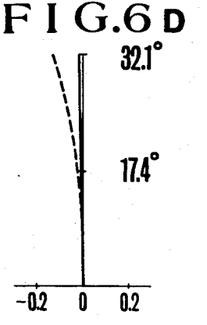
FIGS. 6D, 6E and 6F show astigmatisms of the zoom lens of FIG. 5 when zoomed at the shortest, middle and longest focal length positions respectively.
Figure 6E:
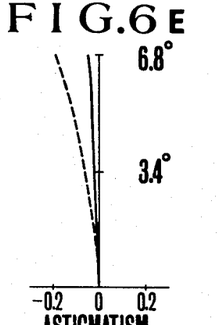
Figure 6F:
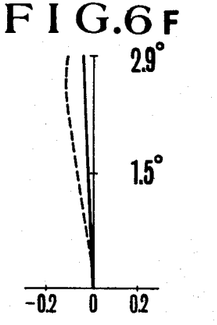
Figure 6G:
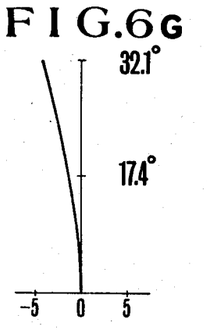
FIGS. 6G, 6H and 6I show distortions of the zoom lens of FIG. 5 when zoomed at the shortest, middle and longest focal length positions respectively.
Figure 6H:
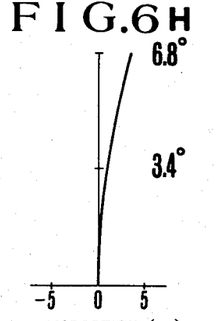
Figure 6I:
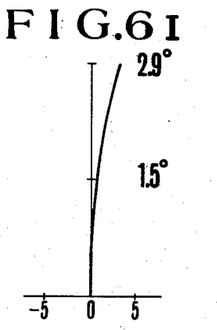
Figure 7:
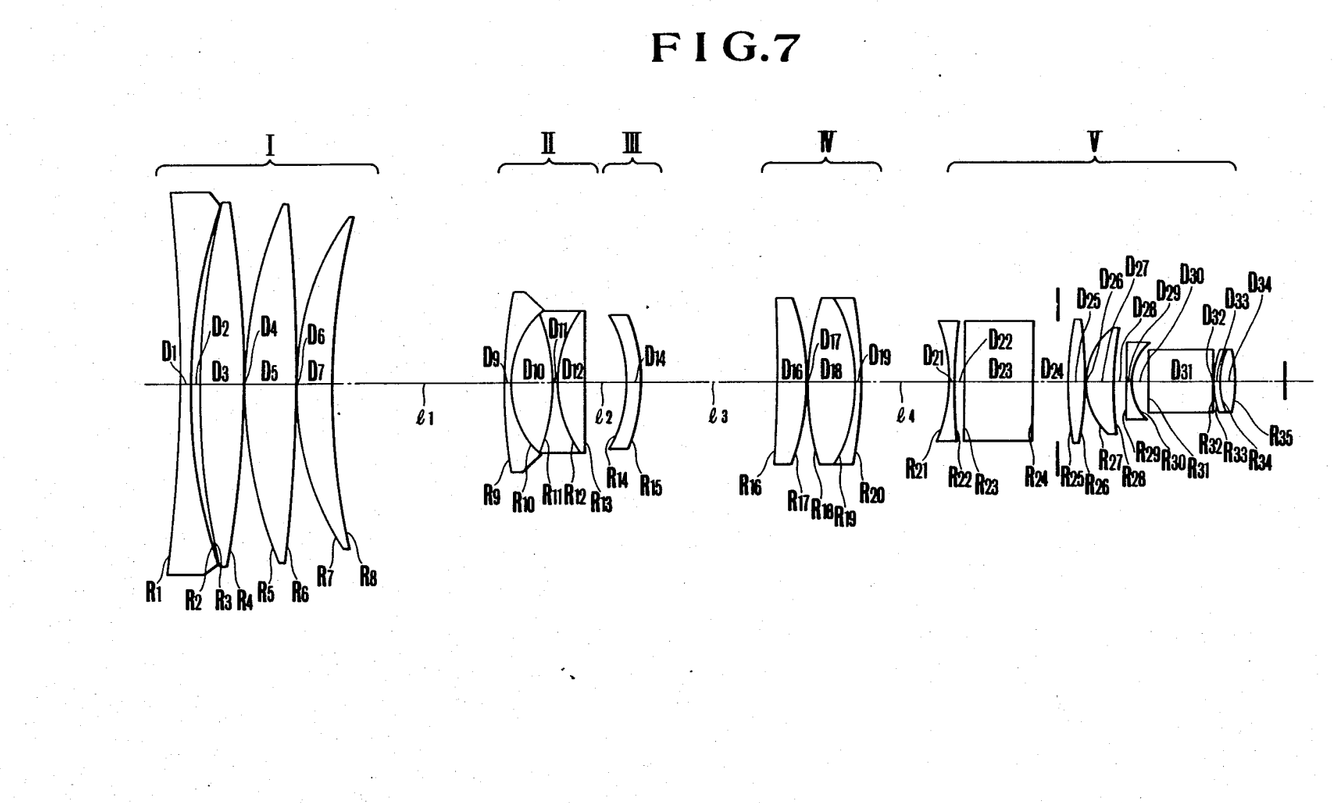
FIG. 7 is a block diagram of a second specific example of a zoom lens according to the present invention.
Figure 8A:
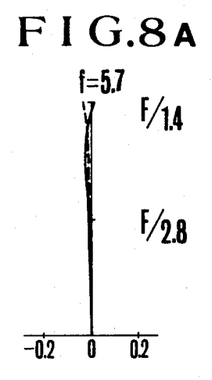
FIGS. 8A to 8I are various aberration curves of the zoom lens of FIG. 7.
Figure 8B:
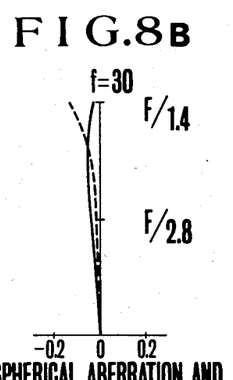
Figure 8C:
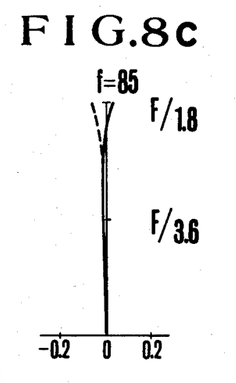
Figure 8D:
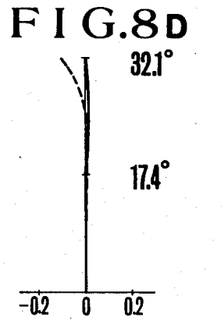
Figure 8E:
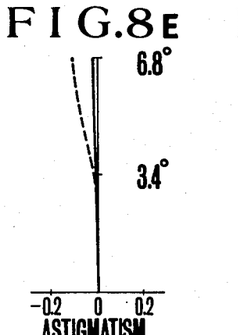
Figure 8F:
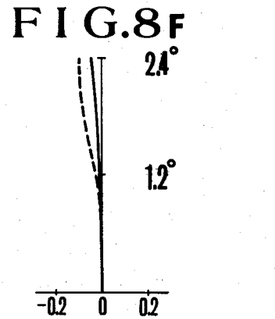
Figure 8G:
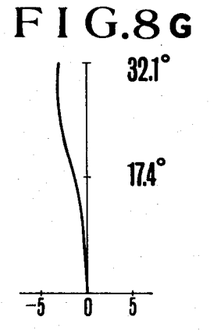
Figure 8H:
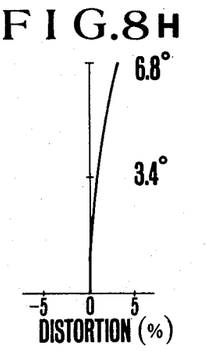
Figure 8I:
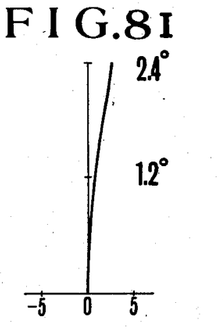

Another advantage of configuring the second lens group III to a meniscus shape of rearward convexity is that even at the wide-angle settings, the astigmatism is further over-corrected, as can be seen from FIGS. 3 and 4. In FIG. 3, a negative meniscus lens is shown as positioned when zooming to the wide angle setting and as cooperating with an on-axis ray $L_1$ and off-axis ray $L_2$. FIG. 4 is given for facilitating the better understanding of the function of the same lens at the telephoto setting for the purpose of comparison with the wide angle setting. By configuring the second lens group III to a meniscus shape of rearward convexity, the angle of the off-axis ray $L_2$ incident upon this group with respect to the normal passing through the incident point is considerably larger than that occurring at the telephoto setting, thereby giving a possibility of utilizing higher order aberrations which result in over-correction of astigmatism, as these higher order aberrations are produced to large extent. At the same time, however, barrel type distortion is also produced. But the ratio of the amount of distortion produced to the amount of astigmatism produced for the first lens group II is far larger than that for the second lens group II. Therefore it is easy to compensate the distortion introduced by the second lens group III by the bending of the first lens group to a small extent.

EXAMPLE 1

| Radius of curvature | | Thickness and separation | | Refractive index | | Abbe number | |
|---|---|---|---|---|---|---|---|
| $R_1$ | −378.222 | $D_1$ | 2. | $N_1$ | 1.80518 | $V_1$ | 25.4 |
| $R_2$ | 92. | $D_2$ | 0.85 | | | | |
| $R_3$ | 111.49 | $D_3$ | 8.32 | $N_2$ | 1.60311 | $V_2$ | 60.7 |
| $R_4$ | −183.481 | $D_4$ | 0.15 | | | | |
| $R_5$ | 84.501 | $D_5$ | 7.02 | $N_3$ | 1.60311 | $V_3$ | 60.7 |
| $R_6$ | −585.935 | $D_6$ | 0.15 | | | | |
| $R_7$ | 52.4202 | $D_7$ | 6.12 | $N_4$ | 1.6968 | $V_4$ | 55.5 |
| $R_8$ | 171.871 | $l_1$ | | | | | |
| $R_9$ | 81.7551 | $D_8$ | 1. | $N_5$ | 1.804 | $V_5$ | 46.6 |
| $R_{10}$ | 17.009 | $D_9$ | 6.43 | | | | |
| $R_{11}$ | −30.4226 | $D_{10}$ | 0.68 | $N_6$ | 1.804 | $V_6$ | 46.6 |
| $R_{12}$ | 19.722 | $D_{11}$ | 6.17 | $N_7$ | 1.92286 | $V_7$ | 21.3 |
| $R_{13}$ | 300.52 | $l_2$ | | | | | |
| $R_{14}$ | −22.044 | $D_{12}$ | 3.03 | $N_8$ | 1.60311 | $V_8$ | 60.7 |
| $R_{15}$ | −29.1956 | $l_3$ | | | | | |
| $R_{16}$ | −239.781 | $D_{13}$ | 4.6 | $N_9$ | 1.6968 | $V_9$ | 55.5 |
| $R_{17}$ | −36.475 | $D_{14}$ | 0.15 | | | | |
| $R_{18}$ | 44.6965 | $D_{15}$ | 7.23 | $N_{10}$ | 1.6516 | $V_{10}$ | 58.6 |
| $R_{19}$ | −29.7397 | $D_{16}$ | 0.8 | $N_{11}$ | 1.80518 | $V_{11}$ | 25.4 |
| $R_{20}$ | −101.31 | $l_4$ | | | | | |
| $R_{21}$ | −27.6207 | $D_{17}$ | 0.8 | $N_{12}$ | 1.60311 | $V_{12}$ | 60.7 |
| $R_{22}$ | 172.266 | $D_{18}$ | 1.5 | | | | |
| $R_{23}$ | ∞ | $D_{19}$ | 11. | $N_{13}$ | 1.63854 | $V_{13}$ | 55.4 |
| $R_{24}$ | ∞ | $D_{20}$ | 5.5 | | | | |
| $R_{25}$ | 47.7667 | $D_{21}$ | 2.85 | $N_{14}$ | 1.8061 | $V_{14}$ | 40.9 |
| $R_{26}$ | −51.5094 | $D_{22}$ | 0.15 | | | | |
| $R_{27}$ | 11.4457 | $D_{23}$ | 4.12 | $N_{15}$ | 1.6516 | $V_{15}$ | 58.6 |
| $R_{28}$ | 72.7306 | $D_{24}$ | 1.58 | | | | |
| $R_{29}$ | 154.928 | $D_{25}$ | 0.7 | $N_{16}$ | 1.80518 | $V_{16}$ | 25.4 |
| $R_{30}$ | 8.1 | $D_{26}$ | 7.85 | | | | |
| $R_{31}$ | 15.51 | $D_{27}$ | 2. | $N_{17}$ | 1.60311 | $V_{17}$ | 60.7 |
| $R_{32}$ | −173.896 | | | | | | |

| | f = 5.7 | f = 2.9 | f = 70 |
|---|---|---|---|
| $l_1$ | 0.4917 | 24.8117 | 32.3317 |
| $l_2$ | 26.434 | 11.234 | 9.034 |
| $l_3$ | 37.8258 | 14.9183 | 0.857 |
| $l_4$ | 1.8722 | 15.6597 | 24.4009 |

EXAMPLE 2

| Radius curvature | | Thickness and separation | | Refractive index | | Abbe number | |
|---|---|---|---|---|---|---|---|
| | f = 5.7 − 85 | | | f-number 1 : 1.4 − 1 : 1.8 | | | |
| $R_1$ | −371.167 | $D_1$ | 2. | $N_1$ | 1.80518 | $V_1$ | 25.4 |
| $R_2$ | 94.316 | $D_2$ | 1.44 | | | | |
| $R_3$ | 134.619 | $D_3$ | 7.25 | $N_2$ | 1.60311 | $V_2$ | 60.7 |
| $R_4$ | −203.77 | $D_4$ | 0.15 | | | | |
| $R_5$ | 76.372 | $D_5$ | 8.33 | $N_3$ | 1.60311 | $V_3$ | 60.7 |
| $R_6$ | −307.891 | $D_6$ | 0.15 | | | | |
| $R_7$ | 51.609 | $D_7$ | 5.72 | $N_4$ | 1.6968 | $V_4$ | 55.5 |

-continued

| Radius curvature | | Thickness and separation | | Refractive index | | Abbe number | |
|---|---|---|---|---|---|---|---|
| | f = 5.7 − 85 | | | f-number 1 : 1.4 − 1 : 1.8 | | | |
| $R_8$ | 118.997 | $l_1$ | | | | | |
| $R_9$ | 82.49 | $D_8$ | 1. | $N_5$ | 1.804 | $V_5$ | 46.6 |
| $R_{10}$ | 16.416 | $D_9$ | 6.8 | | | | |
| $R_{11}$ | −33.441 | $D_{10}$ | 0.8 | $N_6$ | 1.804 | $V_6$ | 46.6 |
| $R_{12}$ | 20.124 | $D_{11}$ | 4.4 | $N_7$ | 1.92286 | $V_7$ | 21.3 |
| $R_{13}$ | 262.115 | $l_2$ | | | | | |
| $R_{14}$ | −23.309 | $D_{12}$ | 2.34 | $N_8$ | 1.60311 | $V_8$ | 60.7 |
| $R_{15}$ | −31.24 | $l_3$ | | | | | |
| $R_{16}$ | −211.031 | $D_{13}$ | 4.77 | $N_9$ | 1.6968 | $V_9$ | 55.5 |
| $R_{17}$ | −38.698 | $D_{14}$ | 0.15 | | | | |
| $R_{18}$ | 47.444 | $D_{15}$ | 7.76 | $N_{10}$ | 1.6516 | $V_{10}$ | 58.6 |
| $R_{19}$ | −28.376 | $D_{16}$ | 0.8 | $N_{11}$ | 1.80518 | $V_{11}$ | 25.4 |
| $R_{20}$ | −74.181 | $l_4$ | | | | | |
| $R_{21}$ | −28.508 | $D_{17}$ | 1. | $N_{12}$ | 1.60311 | $V_{12}$ | 60.7 |
| $R_{22}$ | 126.668 | $D_{18}$ | 1.5 | | | | |
| $R_{23}$ | ∞ | $D_{19}$ | 11. | $N_{13}$ | 1.63854 | $V_{13}$ | 55.5 |
| $R_{24}$ | ∞ | $D_{20}$ | 5.5 | | | | |
| $R_{25}$ | 49.837 | $D_{21}$ | 3. | $N_{14}$ | 1.8061 | $V_{14}$ | 40.9 |
| $R_{26}$ | −53.168 | $D_{22}$ | 0.15 | | | | |
| $R_{27}$ | 12.6686 | $D_{23}$ | 4.3 | $N_{15}$ | 1.6516 | $V_{15}$ | 58.6 |
| $R_{28}$ | 67.666 | $D_{24}$ | 1.93 | | | | |
| $R_{29}$ | 120.165 | $D_{25}$ | 0.7 | $N_{16}$ | 0.80518 | $V_{16}$ | 25.4 |
| $R_{30}$ | 8.6197 | $D_{26}$ | 2.75 | | | | |
| $R_{31}$ | 0. | $D_{27}$ | 10.5 | $N_{17}$ | 1.63854 | $V_{17}$ | 55.4 |
| $R_{32}$ | 0. | $D_{28}$ | 0.2 | | | | |
| $R_{33}$ | 14.781 | $D_{29}$ | 0.8 | $N_{18}$ | 1.7552 | $V_{18}$ | 27.5 |
| $R_{34}$ | 10.1994 | $D_{30}$ | 2.5 | $N_{19}$ | 1.58913 | $V_{19}$ | 61.1 |
| $R_{35}$ | −56.1392 | | | | | | |

| | f = 5.7 | f = 30 | f = 85 |
|---|---|---|---|
| $l_1$ | 0.7989 | 27.9989 | 35.8589 |
| $l_2$ | 23.1365 | 6.9565 | 5.8565 |
| $l_3$ | 45.0842 | 21.9434 | 2.9094 |
| $l_4$ | 1.9327 | 14.0536 | 26.3275 |

It will be seen from the foregoing description that the present invention contemplates the use of an additional zoom control lens group as arranged between a negative lens group for variation of magnification and a positive lens group for compensation of image plane shift in constructing a zoom lens with an increased image angle, increased relative aperture and increased zoom ratio, while preserving a good stability of correction of aberrations throughout the extended zooming range which is achieved by imparting a negative refractive power into the additional or third movable lens group.

Another design feature of the invention is that when zooming to the telephoto settings, the additional or third zoom control lens group and the so-called variator approach to each other, thus assisting in the achievement of good stability of aberrational correction during zooming. As the third lens group is moved toward the image plane when zooming from the wide-angle to the telephoto position, a magnification varying effect is multiplied to facilitate the increase in zoom ratio and the shortening of the longitudinal length of the zoom part.

By the use of the principles of the invention, it is made possible to realize a zoom lens having a varifocal range of f = 5.7–70.0 (zoom ratio : 12) with F-number 1 : 1.4 and a zoom lens having a varifocal range of f = 5.7–85.0 (zoom ratio : 15) with F-number 1 : 1.4–1 : 1.8, while the size of the zoom lens being maintained at the same level as that of the conventional one having a zoom ratio of 10.

What is claimed:

1. A zoom lens system comprising:
   a first lens part having a positive refractive power, being comprised of a plurality of lens elements, and having a focusing function, said first lens part being fixed during zooming;
   a zooming lens part being comprised of a front movable lens group, a middle movable lens group and a rear movable lens group, and being positioned on the image side of said first lens part;
   said front movable lens group having a negative refractive power, and
   said rear movable lens group having a positive refractive power;
   a prime lens part having a positive refractive power, being comprised of a plurality of lens elements, and being positioned on the image side of said zooming lens part;
   the three movable lens group being moved simultaneously and independently of each other during zooming;
   said front movable lens group being moved toward the image side, and
   said rear movable lens group being moved toward the object side as the focal length of the entire system is increased;
   said front movable lens group and said middle movable lens group being spaced by a shortest distance when the focal length of the entire system is longest; and
   wherein the front surface of said middle movable lens group is concave toward the object side, and the rear surface is convex toward the image side.

2. A zoom lens system comprising:
   a focusing lens group composed of a plurality of lenses and fixed during zooming;
   a zooming part positioned closer to the image than the focusing lens group, and having
      a first movable lens group having a negative refractive power,
      a second movable lens group composed of a negative lens, and
      a third movable lens group having a positive refractive power; and
   an image forming lens positioned closer to the image than the zooming part;
   said first, second and third movable lens groups moving simultaneously but independently in the axial direction for zooming, and said first and second movable lens groups approaching each other when a focal length of the zoom lens system is long and departing from each other when the focal length is short, the focal length ($f_{III}$) of the second movable lens group being more than 8 times but less than 13.43 times of a compound focal length ($f_{II,III}$) of the first and second movable lens groups at the time of a long focal distance.

* * * * *